United States Patent
Ha

(10) Patent No.: US 7,134,329 B2
(45) Date of Patent: Nov. 14, 2006

(54) TORQUE DETECTING APPARATUS

(75) Inventor: Kyoung Pyo Ha, Hwaseong (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 11/200,781

(22) Filed: Aug. 9, 2005

(65) Prior Publication Data
US 2006/0032302 A1 Feb. 16, 2006

(30) Foreign Application Priority Data
Aug. 11, 2004 (KR) .................. 10-2004-0063252

(51) Int. Cl.
G01F 15/08 (2006.01)

(52) U.S. Cl. .............. 73/200; 73/862.325; 73/862.326; 73/862.328; 73/862.329

(58) Field of Classification Search ................. 73/200, 73/862.325, 862.326, 862.328, 862.329, 73/862.192, 862.193
See application file for complete search history.

(56) References Cited

U.S. PATENT DOCUMENTS 4,592,241 A * 6/1986 Obayashi et al. ...... 73/862.328
5,767,420 A * 6/1998 de Schepper et al. ... 73/862.329

FOREIGN PATENT DOCUMENTS
JP 2001-304985 10/2001

* cited by examiner

Primary Examiner—Edward Lefkowitz
Assistant Examiner—Jermaine Jenkins
(74) Attorney, Agent, or Firm—Morgan Lewis & Bockius LLP

(57) ABSTRACT

The present invention provides a torque detecting apparatus that includes a drive plate that is elastically deformable in response to an applied torque, strain gauges, and a torque detecting circuit, and the torque detecting apparatus can accurately detect torque transmitted from an engine output element of a vehicle having an automatic transmission to a torque converter input element.

5 Claims, 5 Drawing Sheets

TORQUE DETECTING APPARATUS

CROSS REFERENCE TO RELATED APPLICATION

This application claims priority to Korean Application No. 10-2004-0063252, filed on Aug. 11, 2004, and the disclosure of which is incorporated herein by reference in its entirety.

FIELD OF THE INVENTION

The present invention generally relates to a torque detecting apparatus. More particularly, the present invention relates to an apparatus for detecting torque output from an engine of a vehicle having an automatic transmission.

BACKGROUND OF THE INVENTION

In order to improve engine efficiency, it is important to promote power transmitting efficiency as well as engine efficiency.

To promote the power transmitting efficiency, it is necessary to have the engine output and transmitted power in respective power transmitting steps detected when the engine is operating.

Generally, the power transmitted by a shaft is detected by a torque meter. Because the torque meter is already commercialized, a torque meter suited to a target object can be applied. In addition, the engine mounting portion must be excessively deformed so that the commercial torque meter can be mounted between the engine and the transmission.

Generally, an apparatus for transmitting engine output to a transmission can be divided into a single mass flywheel, a dual mass flywheel, and a drive plate.

In the case of an automatic transmission vehicle, detecting power transmitted from an engine to the transmission is very important. However, an apparatus that can detect power transmitted by the drive plate has not yet been commercialized.

The information disclosed in this section is only for enhancement of understanding of the background of the invention and should not be taken as an acknowledgement or any form of suggestion that this information forms the prior art that is already known in this country to a person of ordinary skill in the art.

SUMMARY OF THE INVENTION

The present invention provides a torque detecting apparatus having non-limiting advantages of detecting torque of a vehicle having an automatic transmission.

According to an embodiment of the present invention, an exemplary torque detecting apparatus for detecting torque transmitted from an engine output element to a torque converter input element includes a drive plate configured to be respectively connectable with the engine output element and the torque converter input element and to be elastically deformable in response to torque transmitted from the engine output element to the torque converter input element, at least one strain gauge mounted to the drive plate, and a torque detecting circuit electrically connected to the strain gauge for applying electrical signals to the strain gauge and for receiving electrical signals output from the strain gauge, the torque detecting circuit generating torque signals on the basis of the electrical signals output from the strain gauge.

The drive plate comprises a first connecting portion configured to be connectable with the engine output element, a second connecting portion configured to be connectable with the torque converter input element, and a plurality of coupling portions connecting the first connecting portion and the second connecting portion. The plurality of coupling portions are disposed not to be equidistant from each other, and the strain gauge is mounted to a coupling portion that is relatively farther from neighboring coupling portions than the neighboring coupling portions are from each other.

The at least one strain gauge comprises a pair of strain gauges, and the pair of strain gauges are mounted to substantially identical positions on each side of and away from a longitudinal center of the coupling portion that is relatively farther from the neighboring coupling portions.

The torque detecting circuit comprises a first module transforming an alternating current supplied from an electric power supplying device to a direct current; a second module receiving the direct current from the first module, applying electrical signals to the strain gauge, receiving electrical signals output from the strain gauge, and transforming the received electrical signals into digital signals; and a third module receiving the direct current from the first module, receiving the digital signals from the second module, and outputting the received digital signals.

The first, second, and third modules are secured to the drive plate, and the third module comprises an antenna for wireless transmission of the digital signals.

The electric power supplying device comprises a first coil, and a second coil mounted to the drive plate apart from the first coil by a predetermined distance.

BRIEF DESCRIPTION OF THE DRAWINGS

The accompanying drawings illustrate an exemplary embodiment of the present invention, and, together with the description, serve to explain the principles of the present invention, wherein.

DETAILED DESCRIPTION OF THE EMBODIMENTS

An embodiment of the present invention will hereinafter be described in detail with reference to the accompanying drawings.

The present invention relates to a torque detecting apparatus that can detect torque transmitted from an engine to a transmission of a vehicle having an automatic transmission, in which power output from an engine is transmitted to the automatic transmission via a drive plate.

Figure 1:
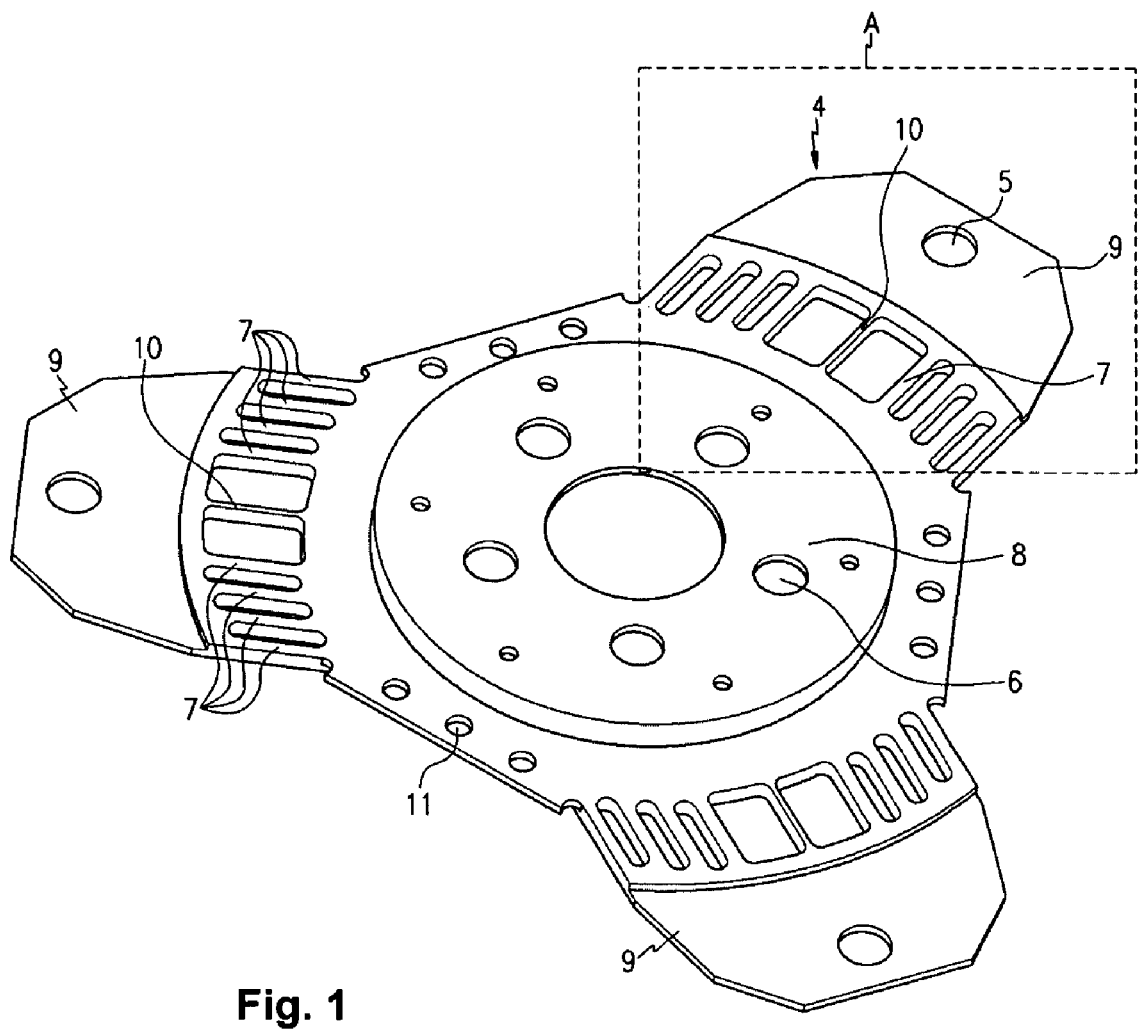
FIG. 1 is a perspective view of a drive plate according to an embodiment of the present invention.
Figure 2:
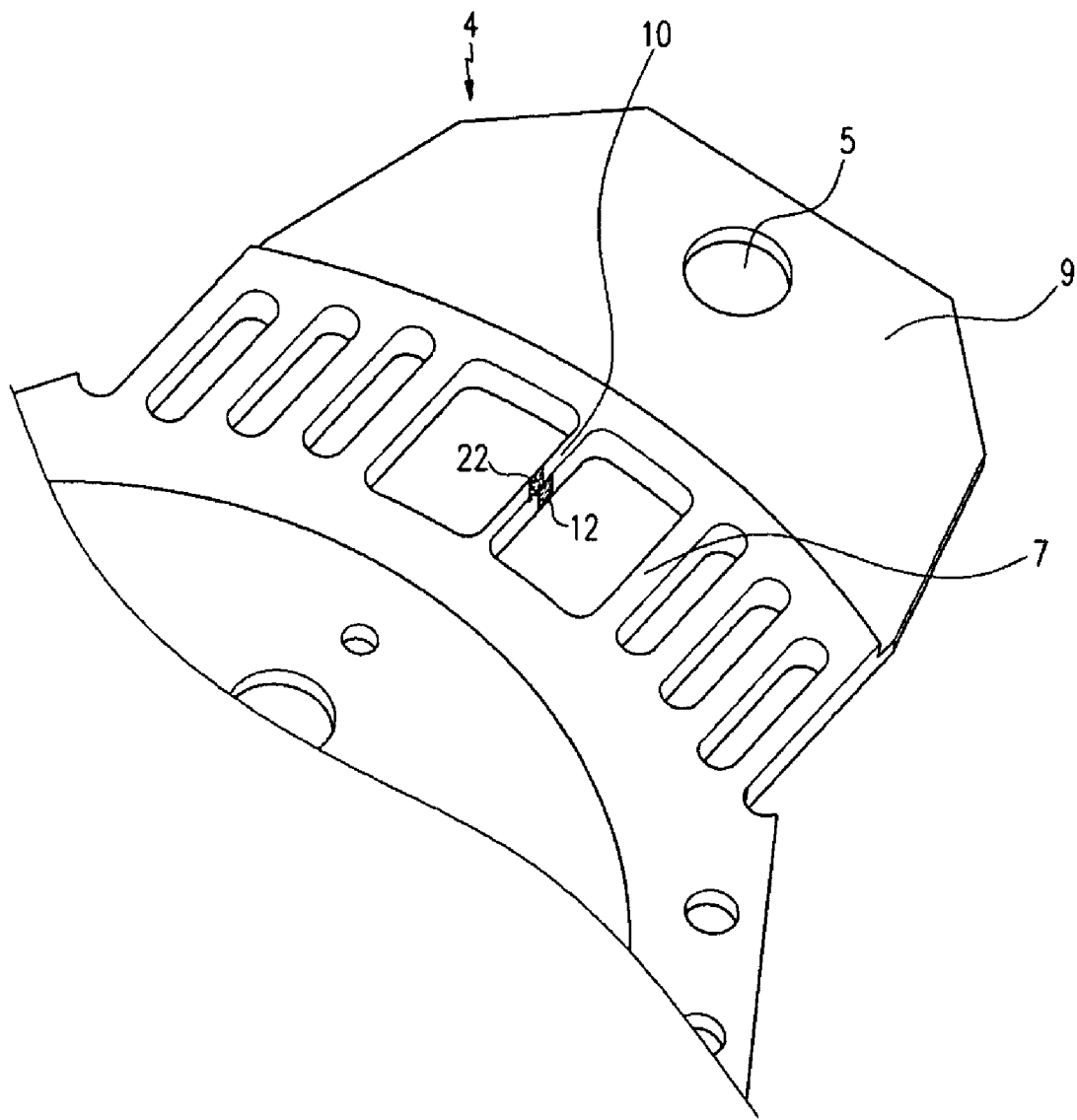
FIG. 2 is an enlarged view of portion A of FIG. 1.
Figure 3:
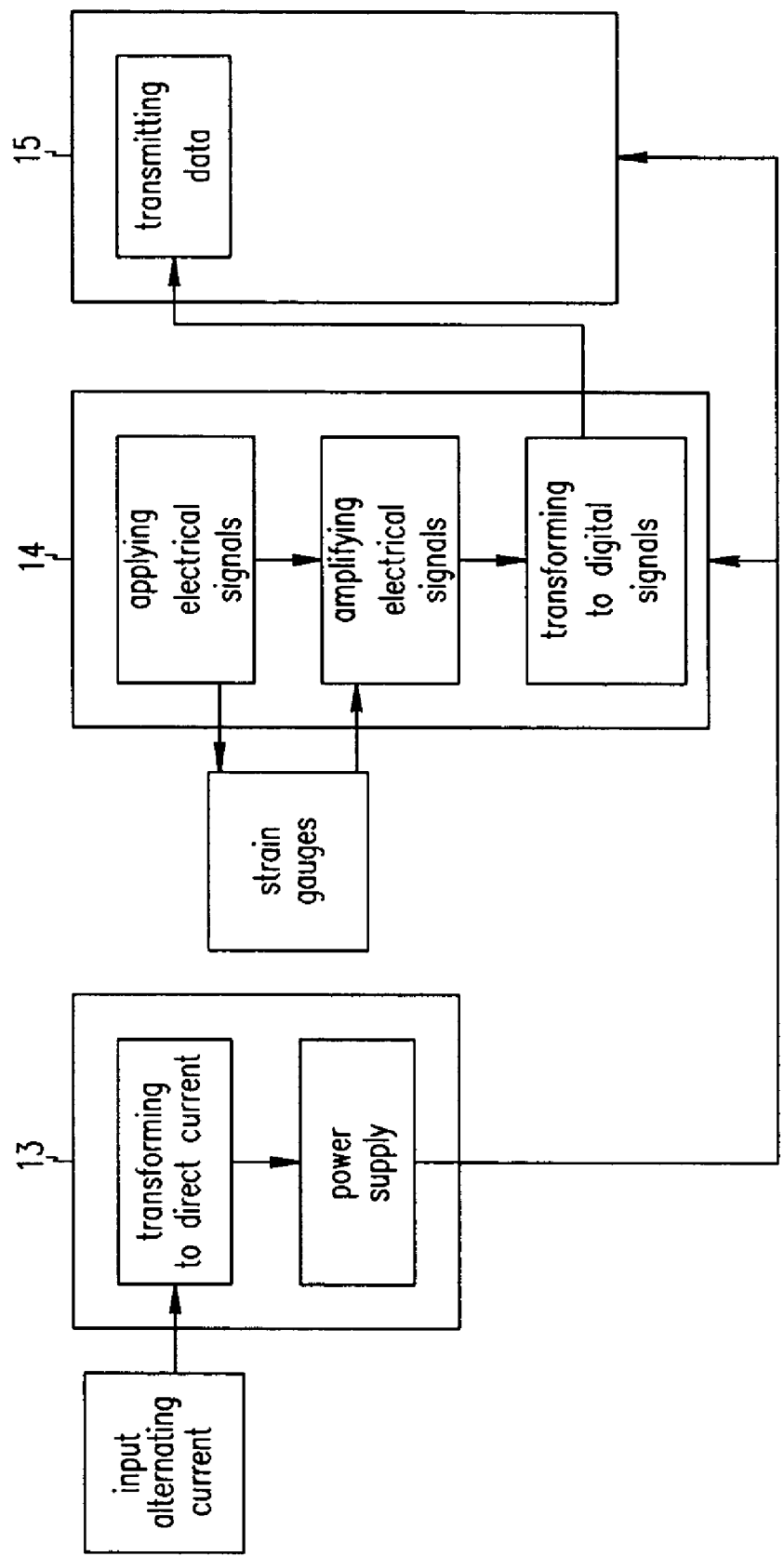
FIG. 3 shows a torque detecting circuit according to an embodiment of the present invention.
Figure 4:
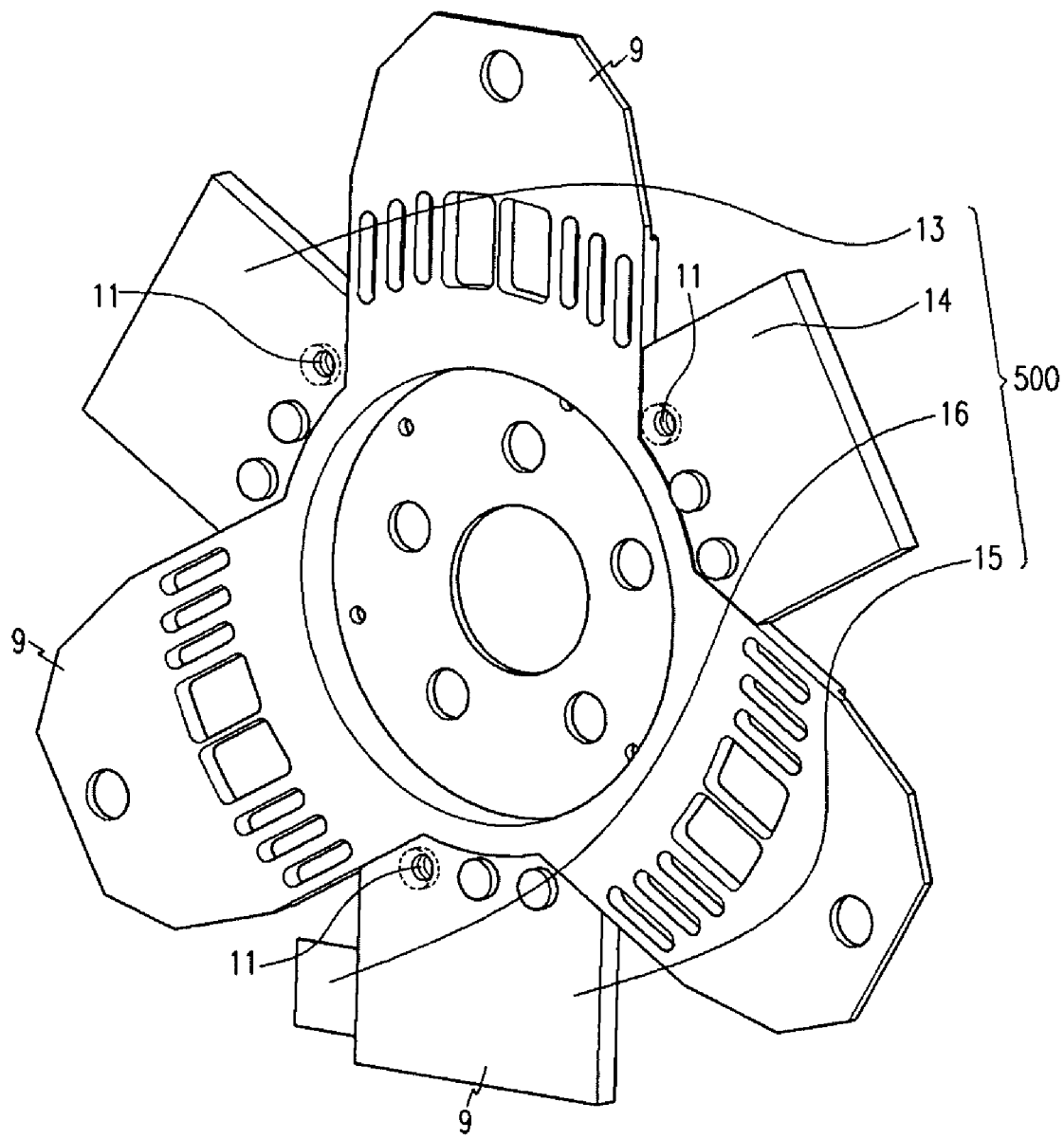
FIG. 4 shows modules of the torque detecting circuit according to an embodiment of the present invention.
Figure 5:
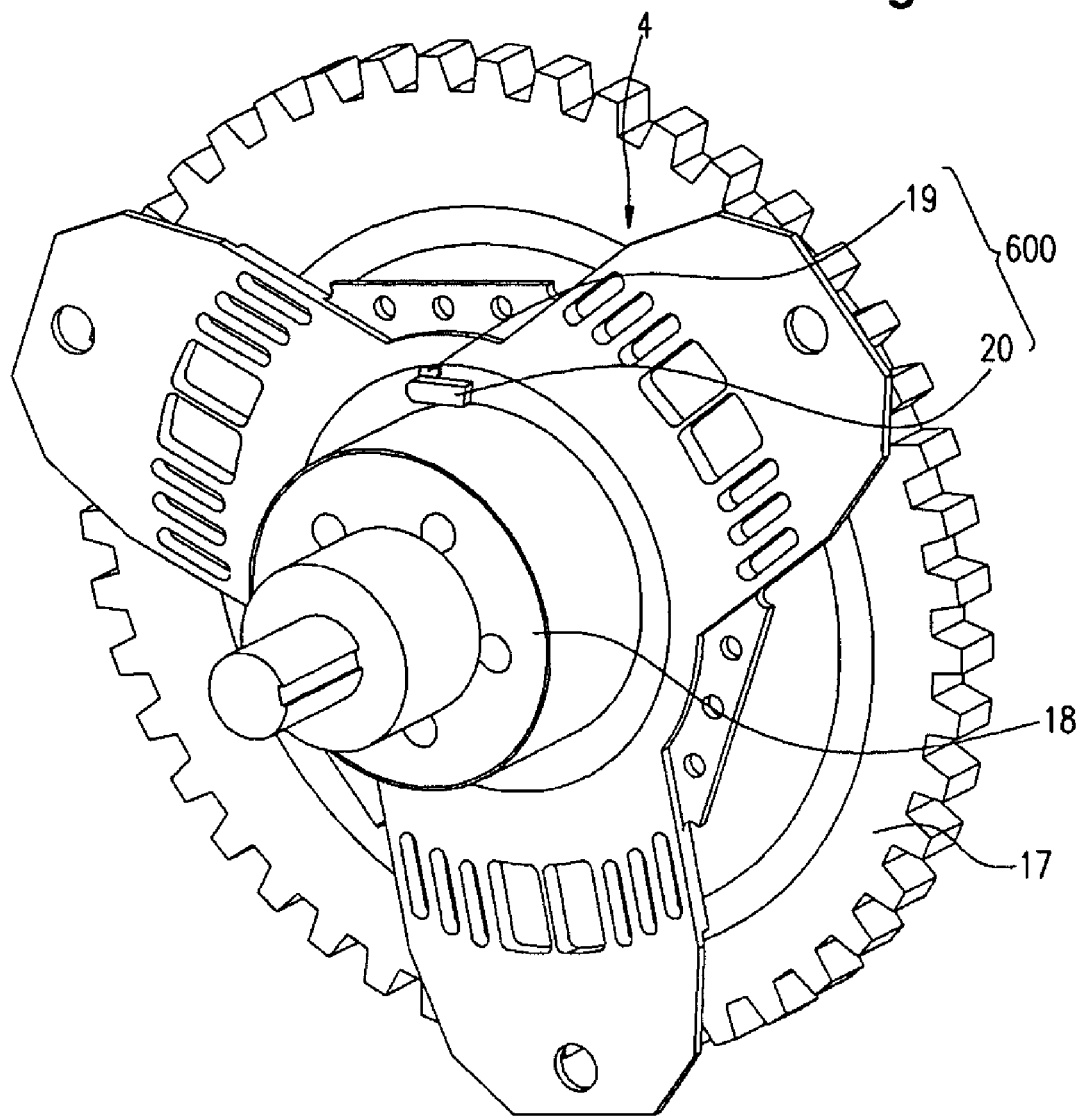
FIG. 5 shows an electric power supplying device according to an embodiment of the present invention.

FIG. 1 is a perspective view of a drive plate 4 according to an embodiment of the present invention, FIG. 2 is an enlarged view of portion A of FIG. 1, FIG. 3 shows a torque detecting circuit according to an embodiment of the present invention, FIG. 4 shows modules of the torque detecting circuit according to an embodiment of the present invention, and FIG. 5 shows an electric power supplying device according to an embodiment of the present invention.

Referring to FIGS. 1, 2, 3, 4, and 5, the torque detecting apparatus according to the embodiment of the present invention detects torque transmitted from an engine output element 18 to a torque converter input element 17, and includes a drive plate 4, at least one strain gauge 12, 22, and a torque detecting circuit 500. In this embodiment, the at least one strain gauge includes four strain gauges 12, 22.

The drive plate 4 is configured to be respectively connectable with the engine output element 18 and the torque converter input element 17, and to be elastically deformable in response to torque transmitted from the engine output element 18 to the torque converter input element 17.

The strain gauges 12 and 22 are mounted to the drive plate 4.

The torque detecting circuit 500 is electrically connected to the strain gauges 12 and 22, such that it applies electrical signals thereto and receives electrical signals output therefrom. In addition, the torque detecting circuit 500 generates torque signals based on the electrical signals output from the strain gauges 12 and 22.

Bolt holes 5 and 6 are formed on the drive plate 4, through which the engine output element 18 and the torque converter input element 17 are mounted to the drive plate 4.

Referring to FIG. 1, the drive plate 4 includes a first connecting portion 8, a second connecting portion 9, and a plurality of coupling portions 7 and 10. As shown in FIG. 1, the drive plate 4 includes one first connecting portion 8, three second connecting portions 9, and a plurality of coupling portions 7 and 10.

The first connecting portion 8 is configured to be connectable with the engine output element 18, and the second connecting portions 9 are configured to be connectable with the torque converter input element 17. More particularly, the engine output element 18 is connected to the bolt holes 6 of the first connecting portion 8, and the torque converter input element 17 is connected to the bolt holes 5 of the second connecting portion 9.

The plurality of coupling portions 7 and 10 connect the first connecting portion 8 with the second connecting portion 9, and the plurality of coupling portions 7 and 10 are disposed to be non-equidistant from each other.

In addition, the strain gauges 12 and 22 are mounted to the coupling portions 10, which are relatively farther from the coupling portions 7 than the coupling portions 7 are from each other.

Rigidity of the drive plate 4 is determined by thickness, width, length, and number of the coupling portions 7 and 10. If the rigidity of the drive plate 4 is too high, the degree of deformation caused by transmitted torque is too low, thus it is difficult to detect the torque. If the rigidity of the drive plate 4 is too low, the drive plate 4 can be broken by the transmitted torque. Therefore, according to this embodiment of the present invention, the drive plate 4 includes the plurality of coupling portions 7 and 10 that are configured such that the drive plate 4 has suitable rigidity.

The plurality of coupling portions 7 and 10 include three first coupling portions 10 and twenty-four second coupling portions 7, but it is not restricted thereto. The coupling portions 7 and 10 have measurements of 2 mm (thickness), 5 mm (width), and 20 mm (length). A distance between the first coupling portions 10 and the second coupling portions 7 is widely formed such that deformation caused by the torque is highly generated at the first coupling portions 10.

The strain gauges 12 and 22 generate electrical signals, and they are mounted to substantially identical positions on each side of and away from a longitudinal center of the first coupling portions 10. According to an embodiment of the present invention, the strain gauges 12 and 22 are mounted at the ¼ point of the entire length of the first coupling portions 10 from the second connecting portion 9.

In addition, to detect the torque output from the engine accurately, four strain gauges 12, 22 are mounted to two first coupling portions 10 (i.e., two strain gauges 12 and 22 are mounted to each of two first coupling portions 10). The four strain gauges 12, 22 comprise a full bridge. The full bridge is used in a method that comprises an electrical circuit. Because the strain gauges 12 and 22 are mounted to the drive plate 4 and rotate together with the drive plate 4, an apparatus is needed for supplying electric power thereto and for transmitting electrical signals output from the strain gauges 12 and 22 to the outside.

FIGS. 3 and 4 respectively show a torque detecting circuit 500 and modules of the torque detecting circuit according to an embodiment of the present invention.

As shown in FIG. 4, the torque detecting circuit 500 is connected to bolt holes 11 between the second connecting portions 9 of the drive plate 4 and includes a first module 13, a second module 14, and a third module 15.

The first module 13 transforms an alternating current supplied from an electric power supplying device 600 (see FIG. 5) to a direct current. In addition, the first module 13 supplies the transformed direct current to the second and third modules 14 and 15 through wires (not shown).

The second module 14 receives the direct current from the first module 13, applies electrical signals to the strain gauges 12 and 22, and receives electrical signals output from the strain gauges 12 and 22. In addition, the second module 14 amplifies and transforms the electrical signals output from the strain gauges 12 and 22 into digital signals.

The third module 15 receives the direct current from the first module 13, receives the digital signals from the second module 14, and transmits the received digital signals through an antenna 16 to the outside. According to an embodiment of the present invention, the third module 15 is preferably realized using Bluetooth technology, which is used for wireless communication, but is not limited thereto.

According to an embodiment of the present invention, the respective modules 13, 14, and 15 are mounted in cases made of metal for protecting the modules, but the antenna 16 of the third module 15 protrudes from the case of the third module 15 for wireless transmission.

FIG. 5 shows the electric power supplying device according to an embodiment of the present invention. As shown in FIG. 5, the electric power supplying device 600 includes first coils 19 and second coils 20. The first coils 19 are mounted to a stationary part of the vehicle, e.g., a cylinder block, and the second coils 20 are mounted to the drive plate 4 such that when they align with the first coils 19 they are at a predetermined distance therefrom. The predetermined distance is preferably 1 mm. That is, the second coils 20 are fixed to the drive plate 4, so they rotate together therewith. The first coils are fixed to a stationary part of the vehicle, so the first coils 19 are stationary members.

Although the number of the first coils 19 is shown as two in FIG. 5, it is obvious that the number of the first coils 19 is not restricted thereto.

The alternating current is supplied from outside to the first coil 19 and the current is then transferred to the second coil 20 by electromagnetic induction.

As described above, according to the embodiments of the present invention, the torque detecting apparatus can precisely detect an output torque of the engine of a vehicle that includes an automatic transmission. In addition, the torque detecting apparatus can monitor the output of the engine and precisely detect efficiency of the transmission and the engine, etc., while the engine is operating.

While the present invention has been described in connection with the most practical exemplary embodiments, it is to be understood that the present invention is not limited to the disclosed embodiment, but on the contrary, is intended to cover various modifications and equivalent arrangements included within the spirit and scope of the appended claims.

What is claimed is:

1. A torque detecting apparatus for detecting torque transmitted from an engine output element to a torque converter input element, comprising:
    a drive plate configured to be respectively connectable with the engine output element and the torque converter input element and to be elastically deformable in response to torque transmitted from the engine output element to the torque converter input element;
    at least one strain gauge mounted to the drive plate; and
    a torque detecting circuit electrically connected to the strain gauge for applying electrical signals to the strain gauge and for receiving electrical signals output from the strain gauge, the torque detecting circuit generating torque signals on the basis of the electrical signals output from the strain gauge wherein the drive plate comprises: a first connecting portion configured to be connectable with the engine output element; a second connecting portion configured to be connectable with the torque converter input element; and a plurality of coupling portions connecting the first connecting portion and the second connecting portion, the plurality of coupling portions being disposed not to be equidistant from each other, wherein the strain gauge is mounted to a coupling portion that is relatively farther from neighboring coupling portions than the neighboring coupling portions are from each other.

2. The apparatus of claim 1, wherein the at least one strain gauge is comprised as a pair of strain gauges, and the pair of strain gauges are mounted to substantially identical positions on each side of and away from a longitudinal center of the coupling portion that is relatively farther from the neighboring coupling portions.

3. The apparatus of claim 1, wherein the torque detecting circuit comprises:
    a first module transforming an alternating current supplied from an electric power supplying device to a direct current;
    a second module receiving the direct current from the first module, applying electrical signals to the strain gauge, receiving electrical signals output from the strain gauge, amplifying the electrical signals output from the strain gauge, and transforming the received electrical signals into digital signals; and
    a third module receiving the direct current from the first module, receiving the digital signals from the second module, and outputting the received digital signals.

4. The apparatus of claim 3, wherein the first, second, and third modules are secured to the drive plate; and
    the third module comprises an antenna for wireless transmission of the digital signals.

5. The apparatus of claim 3, wherein the electric power supplying device comprises:
    a first coil; and
    a second coil mounted to the drive plate apart from the first coil by a predetermined distance.

* * * * *